(12) United States Patent
McAnally

(10) Patent No.: US 7,963,682 B2
(45) Date of Patent: Jun. 21, 2011

(54) TEMPORARY EMERGENCY HEADLIGHT FOR VEHICLES

(75) Inventor: William David McAnally, Stouffville (CA)

(73) Assignee: William David McAnally, Stouffville, Ontario (CA)

( * ) Notice: Subject to any disclaimer, the term of this patent is extended or adjusted under 35 U.S.C. 154(b) by 403 days.

(21) Appl. No.: 12/149,221

(22) Filed: Apr. 29, 2008

(65) Prior Publication Data

US 2009/0097267 A1    Apr. 16, 2009

(51) Int. Cl.
*F21V 7/18* (2006.01)
(52) U.S. Cl. .................. 362/516; 362/296.01; 362/507; 362/538

(58) Field of Classification Search .................. 362/516, 362/320, 296.01, 542, 507, 538; 428/41.7, 428/41.8, 42.2, 195.1, 201, 202
See application file for complete search history.

(56) References Cited

U.S. PATENT DOCUMENTS 3,934,065 A * 1/1976 Tung ................. 428/76
4,917,928 A * 4/1990 Heinecke .................. 428/42.2
* cited by examiner

*Primary Examiner* — Sharon E Payne

(57) ABSTRACT

A temporary headlight reflector device for application to a vehicle of a sandwich construction having a temporary elastic or flexible reflective panel with protruding tabs including protective layers releasably bonded by adhesive material to the tab substrate which may be folded over for attachment to the front of a vehicle.

8 Claims, 3 Drawing Sheets

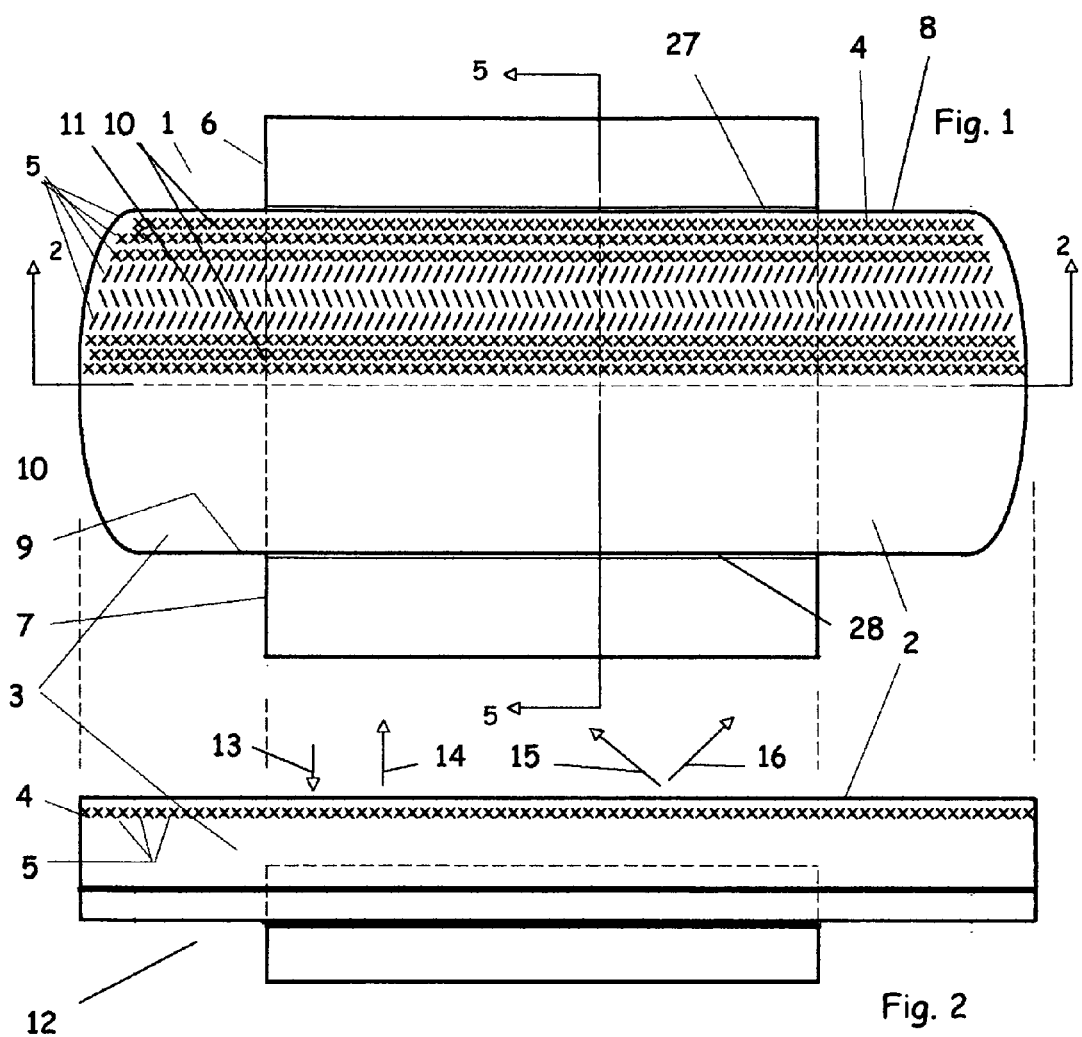

TEMPORARY EMERGENCY HEADLIGHT FOR VEHICLES

FIELD OF THE INVENTION

The invention relates to a temporary headlight reflector device for vehicles and in particular to an emergency reflective device for temporarily covering a defective headlight with a reflective panel.

BACKGROUND OF THE INVENTION

The use of vehicle headlights both by day and by night has two functions. Obviously, the lights assist the driver of the vehicle primarily when driving at night or in shaded locations such as bridges, tunnels and the like.

Another important aspect of the use of headlights is that they assist oncoming drivers and other road users such as pedestrians in locating an oncoming vehicle both at night and by day. The primary function of headlights is obviously to enable the driver to see where he is going at night. However, the headlights of a vehicle also perform other useful functions in that they assist simply as a warning that a vehicle is approaching by night or by day. Headlights also as a means of judging speed of the approaching vehicle, and in many cases, and its location. The spacing of the lights to some extent enable a person to judge the speed of an approaching vehicle.

Most vehicles have two headlights spaced apart on either side of the front of the vehicle. As in the case of any electrical device, headlights may fail. Bulbs may burn out. Wiring may break. A light may be damaged in a minor collision.

In any of these cases, the vehicle is then left with only one light, or in extreme cases, with none at all. If this happens, then where there is only one light which is lit, a pedestrian, or the driver of another oncoming vehicle may have no way of judging the width of the vehicle with the defective light. He may misjudge the location of the defective vehicle on the road and a collision results. Other mishaps may occur as will be apparent to the reader.

Where both headlights fail the situation is even more hazardous. Even if the street lights in the location of the vehicle are sufficient to enable the driver to drive slowly and cautiously to a place of safety, or where he can obtain assistance, the mere presence of an unlit moving vehicle will create great danger for other road users and pedestrians as well.

Often it is not possible for the driver of the defective vehicle to have the light repaired immediately. He may have to drive many miles, especially at night, before finding a service station where the problem can be repaired. The danger will exist as long as he drives the defective vehicle.

It is clearly desirable to have some form of temporary device which can help the driver travel at least some distance to reduce the danger of collision. Ideally, vehicles would be equipped with a portable light which could somehow be fastened in place of the defective light. However, so far such solutions have been impractical and, often, so expensive as to be prohibitive or far to bulky and delicate to remain unobtrusively in a vehicle glove or tool box until such time as they may be required.

OBJECTS OF THE INVENTION

In such a device it is necessary for economical production, manufacture and sale that the device be fabricated from readily available materials and be readily capable of long term safe storage on a vehicle.

It is a further object to utilize strip materials to ease manufacture and provide a slim and flexible or elastic temporary headlight so fit into corners and small spaces whether in storage or when in use.

It is a still further object of the invention to provide a temporary headlight which may be attached to the front of a vehicle but which may also be attached inside the windscreen in unduly inclement weather or where adhesives have been damaged or rendered effective.

BRIEF SUMMARY OF THE INVENTION

The invention provides a temporary vehicle headlight comprising a multi-layer sandwich construction including a reflective layer including means for reflecting incoming ambient light, and a tab layer extending behind and beyond said reflective layer in at least one direction comprising, said tab layer comprising a removable protective layer extending beyond said reflective layer, an adhesive layer, and a backing layer secured to said reflective layer and said protective layer by said adhesive layer.

The invention further provides a temporary headlight wherein the removable protective layer is adapted to be removed upon installation so as to expose the adhesive layer and folded over on itself behind the reflective layer for attachment to the forward portion of a vehicle. The tab layer extends beyond said reflective layer less than ½ the width of said reflective layer.

In another aspect the invention provides a temporary vehicle headlight comprising a multi-layer sandwich construction including a reflective layer including means for reflecting incoming ambient light, and a tab layer extending behind and beyond the reflective layer in at least one direction comprising an adhesive layer, a backing layer secured to the reflective layer, a removable protective layer adhered to the backing layer by an adhesive layer in areas beyond said reflective layer.

DRAWINGS

FIG. 1 is a top plan view of the preferred embodiment of the temporary headlight of the invention before use.

FIG. 2 is a cross-section of the headlight of FIG. 1 taken along line 2-2.

DESCRIPTION OF THE PREFERRED EMBODIMENTS

Figure 3:
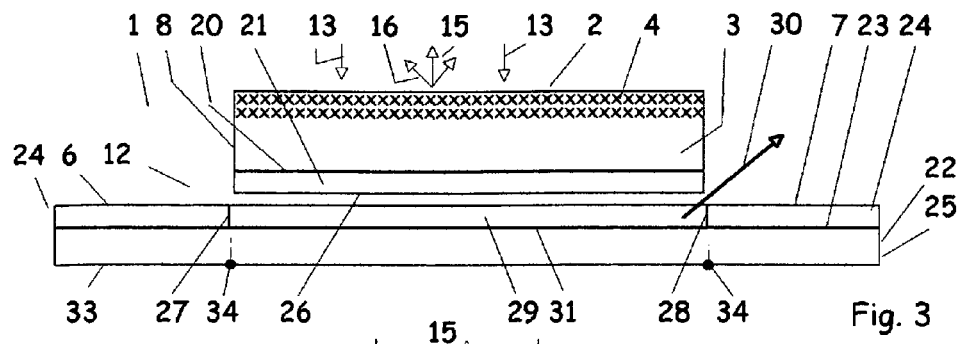
FIG. 3 is a cross-section of the headlight of FIG. 1 generally along line 5-5 illustrating the 1st step of manufacturing assembly of the reflective surface and the attachment substrate into the sandwich construction of the invention.

FIG. 1. illustrates the preferred embodiment of the temporary headlight of the invention 1 in plan view. Forward surface 2 is preferably a flexible or elastic substantially planar synthetic material 3 (FIG. 2) including highly reflective material, as at 4, adapted to reflect light impinging on the front surface of a vehicle. Preferably planar material 3 is translucent and contains a plurality of reflective particles 5 at least near forward surface 2.

Alternatively, reflective material 4 may be a film-like reflective film or surface 2 may be adapted to reflect incoming light by lens like surface adaptations (not shown) in a known manner.

Fold tabs 6 and 7 extend laterally beyond forward surface 2 once the temporary headlight is assembled into its sandwich construction. Preferably forward surface 2 is elongated and attachment tabs 6 and 7 extend from the longer edges 8 and 9.

Further preferably reflective material 3 provides a plurality of bands or areas, as illustrated at 10 and 11 in FIG. 1, each or each pair with different or opposite reflective characteristics arranged laterally as in FIG. 1 or otherwise. As can be seen, bands 10 and 11 provide a blinking affect to the oncoming vehicle or pedestrian due to alternating and changing reflective characteristics of the temporary headlight 1.

FIG. 2 is a central cross-section along line 2-2 in FIG. 1 and illustrates the fully assembled sandwich construction 12 of the headlight. Surface 2 receives incoming light from vehicular traffic or ambient nighttime conditions as at 13. Reflected light is returned forward of the vehicle as at 14 which may be directly reflected as at 15, reflected at various angles to the direction of travel as at 16, or variable or blinking as shown, 15 and 16 together.

Figure 4:
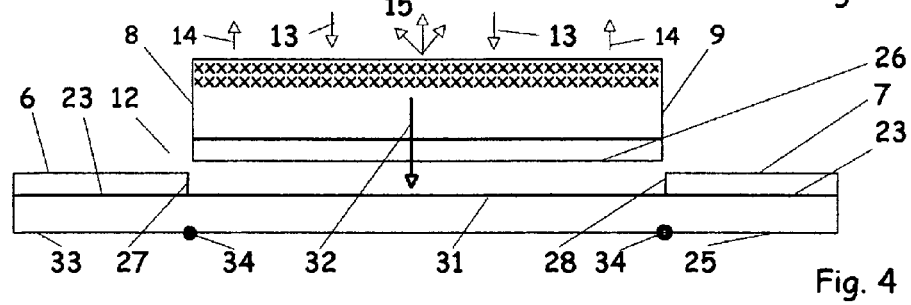
FIG. 4 is a cross-section as in FIG. 3 illustrating the 2nd step of manufacturing assembly of the sandwich construction.

FIGS. 2, 3 and 4 illustrate assembly of the sandwich construction 12 of the headlight 1 by means of a cross-section of the type shown at FIG. 5 (below).

Reflective material 3 preferably includes a strong adhesive layer 20 separating reflective material 3 from a strip-away backing film 21. Such reflective material may advantageously be acquired in strip form or on a spool (not shown). Such reflective material is readily available in the market and is adapted for permanent attachment across its entire surface, unlike the present invention.

Tabs 6 and 7 of the sandwich structure 12 extend behind and beyond at least the smaller dimension of the forward surface 2 and are formed from a continuous strip of peel-off adhesive-backed web material 22 which is also flexible or elastic and which includes a releasable adhesive layer 23 between a peel away layer 24 and a web structure 25 as shown in FIG. 2. Web structure 25 is a printable material commonly available in strip, roll or sheet form. Preferably layer 24 is a relatively thin component of the sandwich 12 and is loosely and releasable bonded to web 25. Further preferably releasable layer 24 is adapted to adhere by adhesive 23 substantially more strongly to the rear surface 26 of reflective material 3 than it is to web 25.

In these figures adhesive layers 20 and 23 are shown in bold line.

Web material 22 is provided with a pair of die cuts as at 27 and 28 which will appear on roll or strip form web at regular intervals for ease of manufacture. Die cuts 27 and 28 are adapted to be separated along the web 22 by a fixed interval which corresponds to the width of reflective material 3 for ease of manufacture and assembly of sandwich construction 12.

The 1st assembly step is shown at 29 in FIG. 3. In this step central portion 29 of peel away layer 23 between die cuts 27 and 28 is removed, as at 30, exposing the central area 31 of adhesive layer 23.

The 2nd assembly step is shown at 32 in FIG. 4. Central portion 29 having been removed, reflective material 3 is installed vertically, as at 32, forming a strong adhesive bond between rear surface 26 and adhesive layer 23 as at 35, thus with structural web 22 in the form of a cross as shown in FIG. 1. As can be seen the web, strip or roll materials 25 and 3 are completely and efficiently utilized with a single pair of uniformly spaced die cuts 27 and 28.

Alternatively, releasable layer 24 may be removed so that adhesive 23 may combine with adhesive layer 23 directly.

The exposed side of web 25 is shown at 33 in FIGS. 2 through 7. This side 33 includes printed material (not shown) relating to the installation and use of the temporary headlight 1 and may be seen through transparent packaging material typically used at retail and which would remain with the product while on stand-by with the user (not shown).

Side 33 further includes printed indicia which are preferably in the form of fold lines 34.

Figure 5:
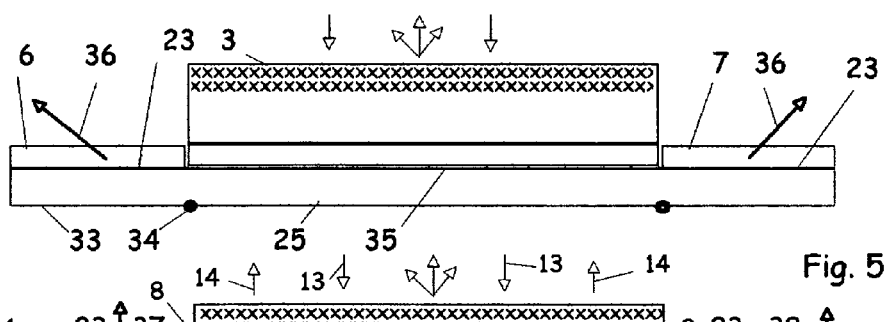
FIG. 5 is a cross-section taken along line 5-5 of the completed headlight.

FIG. 5 illustrates the 1st user step in the application of the temporary headlight 1 to a vehicle. Peel away layer 24 is removed from tabs 6 and 7 as at 36. This removal 36 exposes tabbed sections 37 and 38 of adhesive layer 23 on each side of reflective material 3 as shown in FIG. 6.

Figure 6:
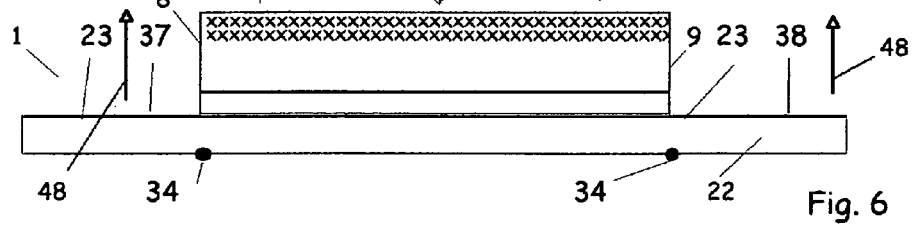
FIG. 6 is a cross-section as in FIG. 5 illustrating the exposed adhesive surfaces.
Figure 7:
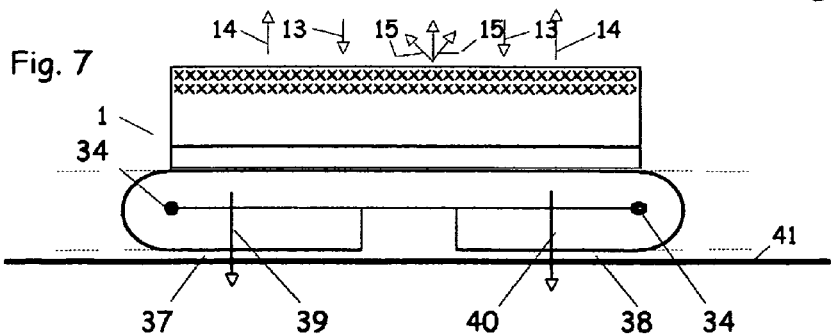
FIG. 7 is a cross-section as in FIG. 6 illustrating the temporary headlight ready for attachment to a vehicle.

At FIG. 6 web material 22 of the temporary headlight 1 is folded over upon itself along fold lines 34 preferably generally aligned with edges 8 and 9. Thus, exposed tab sections 37 and 38 of the adhesive layer 23 are brought to the rear of the headlight in condition for attachment to the front surface 41 of a vehicle in the direction as shown at 39 and 40 of FIG. 7.

Figure 8:
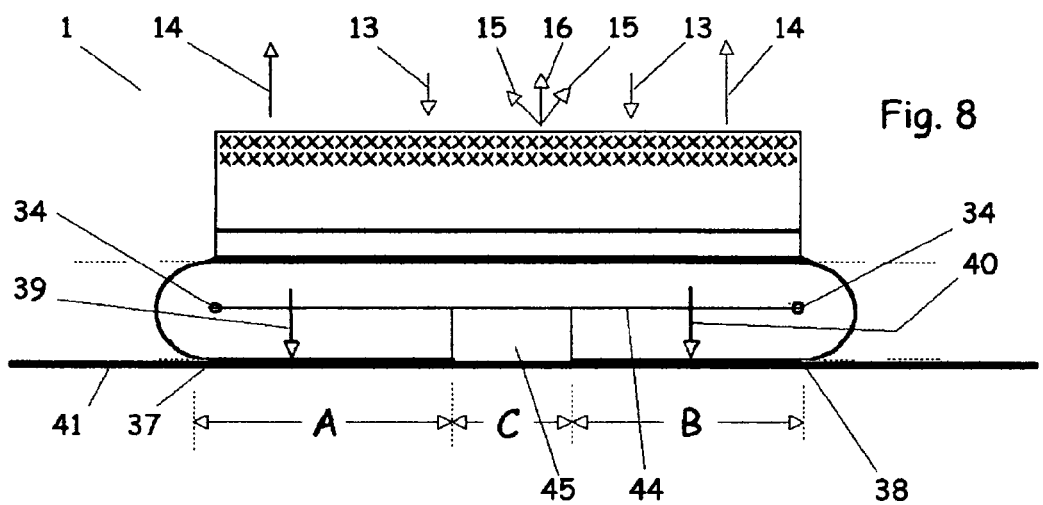
FIG. 8 is a cross-section as in FIG. 7 illustrating the temporary headlight attached to the front surface of a vehicle along adhesion areas A and B.

Complete attachment of the temporary headlight 1 to the front surface of a vehicle as at 41 is illustrated in FIG. 8. Compression along the directions 39 and 40 bring adhesive tabs 37 and 38 into adhering contact with surface 41 in areas marked as A and B respectively. Preferably adhesive tabs 37 and 38 are folded over lines 34 so that there is no overlap as shown at area C on FIG. 8. Non-adhesive rear surface 33, FIG. 3, is now separated from the vehicle surface 41, as at 44 in FIG. 8, and provides ready access to the user for removal of the temporary headlight at cavity 45 which preferably extends the full length of the headlight 1.

Alternatively, and particularly in very cold or inclement weather, temporary headlight 1 may be installed to the inside surface of a vehicle windscreen (not shown) along directions 48 in FIG. 6.

As can be seen in FIG. 8 incoming ambient light 13 from approaching vehicles, streetlighting, signs etc. is reflected forward as at 14. Reflection may occur in a perpendicular path as at 15 or at an angle 16 determined by the surface and reflectance characteristics of reflective material 4.

Figure 9:
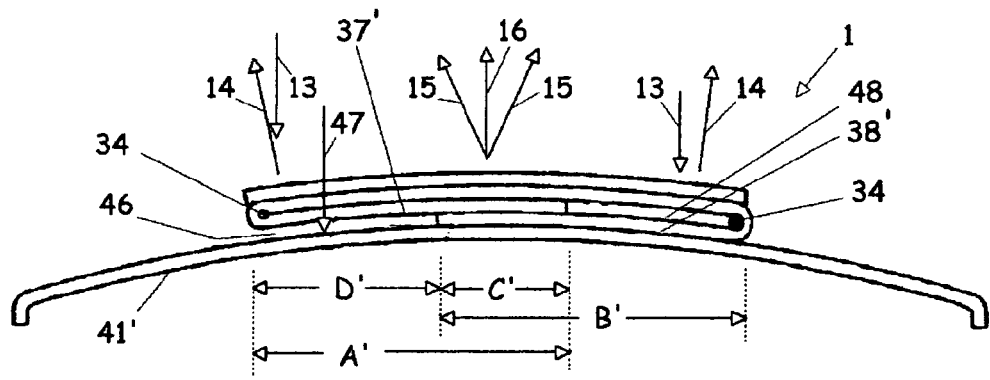
FIG. 9 is a top plan view of another embodiment of the headlight of the invention having wider fold tabs as affixed to a curved vehicle headlight surface.

Another embodiment of the temporary headlight of the invention 1 is shown in FIG. 9 wherein the vehicle forward surface 41' is curved as by a vehicle headlight. Fold over tabs 37' and 38' are considerably wider, as at area A' and B', so as to overlap in area C'. Continuous adhesive coverage of the area A' through B' is provided by compression of the headlight along direction 47 so as to eliminate space 46 bringing adhesive 37' into contact with vehicle surface 41' in area D'. A small cavity 48 may be formed by folding over tab 38 along fold line 34 which adds a facility for ready removal of the headlight.

Other variations of the invention will be apparent to those skilled in the art.

What I claim is:

1. A temporary vehicle headlight comprising a multi-layer sandwich construction including:
    a) A reflective layer including reflection means adapted to reflect incoming ambient light, and
    b) A tab layer extending behind and beyond said reflective layer in at least one direction comprising extending tabs and a backing layer extending behind and beyond said reflective layer secured to said reflective layer behind said reflection means, said backing layer including an adhesive layer on said tabs beyond said reflective layer, and a removable protective layer on said tabs releasably secured in said tab layer by said adhesive layer.

2. A temporary headlight as claimed in claim 1 wherein said removable protective layer is adapted to be removed upon installation so as to expose the adhesive layer.

3. A temporary headlight as claimed in claim 2 wherein said backing layer beyond said reflective layer is adapted to be folded over on itself behind said reflective layer for attachment of said tabs to the forward portion of a vehicle by means of said releasable adhesive behind said reflective layer.

4. A temporary headlight as claimed in claim 3 wherein said tab layer extends beyond said reflective layer less than ½ the width of said reflective layer.

5. A temporary headlight as claimed in claim 1 wherein said reflective layer is elongated and said backing layer is oriented transverse to said elongation.

6. A temporary headlight as claimed in claim 5 wherein said removable protective layer is adapted to be removed upon installation so as to expose the said adhesive layer.

7. A temporary headlight as claimed in claim 1 wherein said backing layer beyond said reflective layer is adapted to be folded over on itself behind said reflective layer for attachment to the forward portion of a vehicle by means of said releasable adhesive.

8. A temporary headlight as claimed in claim 1 wherein said tab layer extends beyond said reflective layer less than ½ the width of said reflective layer.

\* \* \* \* \*